US005751913A

United States Patent [19]

Chiueh et al.

[11] Patent Number: 5,751,913
[45] Date of Patent: *May 12, 1998

[54] RECONFIGURABLE NEURAL NETWORK AND DIFFERENCE-SQUARE NEURON

[75] Inventors: Tzi-Dar Chiueh, Taipei; Hwai-Tsu Chang; Fang-Ru Hsu, both of Hsinchu; Wan-Yu Meng, Taipei, all of Taiwan

[73] Assignee: Industrial Technology Research Institute, Hsien, Taiwan

[*] Notice: The term of this patent shall not extend beyond the expiration date of Pat. No. 5,742,741.

[21] Appl. No.: 688,055

[22] Filed: Jul. 29, 1996

[51] Int. Cl.$^6$ .................................................. G06F 15/18
[52] U.S. Cl. .................................................. 395/27; 395/24
[58] Field of Search .................................. 395/24, 27

[56] References Cited

U.S. PATENT DOCUMENTS

| | | |
|---|---|---|
| 4,326,259 | 4/1982 | Cooper et al. |
| 5,093,900 | 3/1992 | Graf ................................... 395/24 |
| 5,155,802 | 10/1992 | Mueller ............................. 395/11 |
| 5,216,751 | 6/1993 | Gardner et al. |
| 5,533,169 | 7/1996 | Burnod .............................. 395/27 |

OTHER PUBLICATIONS

Blayo, "Implementing radial basis functions neural networks on the systolic MANTRA machine," From Natural to artificial neual computation. International workshop on artificial neural networks. Proceedings, Jun. 1995.

Lee, "A hardware implementation of neural network with modified Hannibal architecture," ransactions of the Korean institute of electical engineers v45 n3, Mar. 1996.

Dadda, "A serial input serial output bit sliced convolver," IEEE 1988, May 1988.

Larsson–Edefors, "Optimising a high speed serial/parallel sum of products hardware structure with respect to bus utilisation," IEE Proceedings—Computers and Digitalk Techniques v142 n1, Jan. 1995.

"80170NX Electrically Trainable Analog Neural Network", Intel Co Menu, pp. 1–42, (1993).

Boser, Bernhard E., et al., "An Analog Neural Network Processor wit Programmable Topology", *IEEE Journal of Solid–State Circuits* vol. 26, No. 12, pp. 2017–2025, (Dec. 1991).

Hammerstrom, Dan, "Working with Neural Networks", *IEEE Spectrum* pp. 46–53, (Jul. 1993).

Mees, Alistair I., et al., "Device Modeling by Radial Basis Functions" *IEEE Transactions on Circuits and Systems–I: Fundamental Theory an Applications*, vol. 39, No. 1, pp. 19–27, (Jan. 1992).

Wawrzynek, John et al., "The Design of a Neuro–Microprocessor" *IEEE Transactions on Neural Networks*, vol. 4, No. 3, pp. 394–399 (May 1993).

*Primary Examiner*—Allen R. MacDonald
*Assistant Examiner*—Jeffrey S. Smith
*Attorney, Agent, or Firm*—Christensen, O'Connor, Johnson & Kindness PLLC

[57] ABSTRACT

A reconfigurable neural network includes several switches each having at least two conductive leads, data flow direction of the conductive leads is programmed to select one of the conductive leads as input switch lead and select another one of the conductive leads as an output switch lead. Several processing elements each having leads connected to the switches, where the processing elements and the switches are interconnected in one-dimension manner. The neural network of interconnected switches and processing elements has a bit-serial input and a bit-serial output. Each of the processing elements comprising: (a) a serial-in-parallel-out difference-square accumulator having a first input coupled to one of the interconnected switches and generating a first output; (b) an activation function for transforming the first output of the serial-in-parallel-out difference-square accumulator and generating a second output; and (c) a parallel-in-serial-out shift register for shifting out the second output of the activation function serially to one of the interconnected switches.

15 Claims, 5 Drawing Sheets

RECONFIGURABLE NEURAL NETWORK AND DIFFERENCE-SQUARE NEURON

CROSS REFERENCE TO RELATED APPLICATIONS

This invention is related to co-filed U.S. patent application Ser. No. 08/683.254 entitled "Reconfigurable Neural Network" assigned to the same assignee as the present application and incorporated herein by reference in their entirety.

FIELD OF THE INVENTION

The present invention relates to neural networks and, more particularly, to reconfigurable neural networks including difference-square type neurons.

BACKGROUND

An artificial neural network (ANN) is composed of many processing elements (PEs), typically referred to as neurons. FIG. 1 is a block diagram illustrating an artificial neural network 2 having three layers of neurons, i.e., an input layer 10, a hidden layer 12 and an output layer 14. Typically, each neuron is responsive to stimuli received through one or more weighted input lines commonly known as synapses. For example, the neuron 16 in the hidden layer 12 is responsive to a single input signal received from a synapse 18. In general, the output lines of the neurons are further connected to the synapses of other neurons, except, of course, the output lines of the neurons in the output layer. The terms "input" and "output" are used herein to refer to input and output signals, respectively. FIG. 2 shows a typical neuron model wherein some input signals $X_1, X_2, \ldots$ and $X_N$ are simultaneously applied to a neuron 20 and processed with corresponding synaptic weights $W_{i1}, W_{i2}, \ldots$ and $W_{iN}$. The weighted inputs are then processed and summed. The sum is further processed through a function $S(\cdot)$, resulting in an output signal $Y_i$. The function $S(\cdot)$, typically referred to as activation, is usually a nonlinear function such as, for example, a sigmoid function, a Gaussian function, a square function or a step function. The particular activation used generally depends on the application for which the artificial neural network 2 is used.

Artificial neural networks may be classified into four categories according to the artificial neural network's learning encoding type and decoding structure. The four categories are: (I) feedforward supervised learning network, (ii) feedback supervised learning network, (iii) feedforward unsupervised learning network and (iv) feedback unsupervised learning network. TABLE 1 organizes several traditional artificial neural networks into an appropriate one of these four categories. The feedforward supervised learning network category, for example, includes the multiple layer perception (MLP), ADALINE and MADALINE networks. These types of artificial neural networks are frequently used for efficiently approximating a real system or reading a solution for classification problems, provided that the numbers of neurons and network layers are sufficiently large.

TABLE 1

| ENCODING | DECODING | |
|---|---|---|
| | FEEDFORWARD | FEEDBACK |
| SUPERVISED | Gradient Descent | RECURRENT BACKPROPAGATION |
| | ADALINE | MADALINE III |
| | MADALINE | |
| | restricted coulomb energy network (RCE) | |
| | radical-basis-function network (RBF) | |
| | reinforcement learning | |
| | Multiple Layer Perception (MLP) | |
| UNSUPERVISED | VECTOR QUANTIZATION | RABAM |
| | winner-take-all network (WTA) | BROWNIAN ANNEALING |
| | self organizing maps | BOLTZMAN LEARNING |
| | competitive learning | ABAM |
| | counter-propagation | ART-2 |
| | | BAM-COHEN-GROSSBERG MODEL |
| | | HOPFIELD circuit |
| | | BRAIN-STATE-IN-A-BOX |
| | | MASKING FIELD |
| | | ADAPTIVE RESONANCE |
| | | ART-1 |
| | | ART-2 |

A radial-based type, also referred to as difference-square type process, can be used in the aforementioned artificial neural network 2. For a neuron i receiving N inputs, the resultant output $Y_i$ may be expressed in a compact form as follows:

$$Y_i = S\left( \sum_{j=1}^{N} (W_{ij} - X_j)^2 \right) \qquad [1]$$

where:

$W_{ij}$ is the corresponding synaptic weight of input $X_j$, and $S$ is the activation function.

This radial based type neuron is typically realized through a 2's complement adder for calculating the distance ($W_{ij} - X_j$) a multiplier for calculating the square of the distance, and followed by a nonlinear circuit for implementing the activation function and generating the output signal $Y_i$.

Artificial neural networks can be further classified into three types of networks depending on what structure is used and whether the artificial neural networks are implemented in analog or digital technologies. A first type of neural network utilizes a digital processor such as a microprocessor, a digital signal processor or a floating point processor for implementing a one-dimension or multi-dimension array to simulate an artificial neural network. U.S. Pat. No. 5,204,938 entitled "Method Of Implementing A Neural Network On A Digital Computer" by David M. Skapura et al. discloses a neural network constructed by tailoring a digital computer architecture. Several processors each have a local memory for storing weights and connectivity information corresponding to neurons of the neural network. A global memory collects and broadcasts the intermediate output values from and to the processors via a data bus. Due to the time needed to shuttling the data back and forth among the processors, the local memories and the global memory, the process speed is typically only a few hundred kilo-connections per second.

A second type of neural network is composed of a large number of multipliers interconnected like a switchboard, and is typically implemented using analog techniques. For example, U.S. Pat. No. 5,087,826 entitled "Multi-Layer Neural Network Employing Multiplexed Output Neurons" and U.S. Pat. No. 5,256,911 entitled "Neural Network With Multiplexes Synaptic Processing" disclose such a neural network. Despite this type's reconfigurablity, high scalability and high process speed (up to several giga-connections per second), this type of structure has an inherent disadvantage because costly analog-to-digital (A/D) and digital-to-analog (D/A) converters are used. Consequently, the second type of artificial neural network is relatively expensive to implement.

Further, this second type of artificial neural network generally has a large external pin count due to the analog technology used therein. A large number of external pins is required primarily because this type of neural network physically maps a multiplier for each synapse. Therefore, this type of artificial neural network typically requires a dedicated input terminal for each synapse and interconnection coupled therebetween. For example, an analog artificial neural network of this type having 256 neurons may have a pin count exceeding 300 pins. Consequently, the analog types of neural networks generally have relatively fewer neurons due to the limited number of external pins available on the integrated circuit(s) implementing the artificial neural network.

The third type of artificial neural network is constructed mainly from a digital circuit as disclosed in U.S. Pat. No. 5,091,864 entitled "Systolic Processor Elements For A Neural Network". This type of artificial neural network uses the digital circuit in an attempt to reduce costs without compromising speed by using a one-dimension structure such as pipeline architecture. Another example of this type of artificial neural network is disclosed by Wawrzynek et al. in "The Design of a Neuro-Microprocessor", IEEE Trans. on Neural Networks, vol. 4, No. 3, May 1993, pp. 394–399. Wawrzynek refers to the disclosed digital neural network as the "SPERT" network. The disclosed SPERT network calculates eight weighted sums concurrently using eight neurons, in which an 8-bit input $X_j$ is broadcasted serially (i.e., bit parallel-byte serial) and a 16-bit synaptic weight is read in parallel through eight ports.

Most digital artificial networks work in a bit-parallel input/output (I/O) manner and, therefore, causing the network to have global I/O ports that increase the complexity of implementing the network. Moreover, due to the limitations of available semiconductor fabrication processes, the number of neurons that can be formed on a single chip is limited. However, most neural networks for practical applications generally require more neurons than can be practically implemented on a single chip. Therefore, a convenient partitionable and scalable architecture is needed to overcome the physical constraints imposed on the semiconductor chip.

Further, in a conventional digital neural network, the bit-parallel I/O increases complexity and area usage, which increases cost. For example, in a conventional digital neural network having an output port of a layer with J neurons connected to the input port of an adjacent layer having K neurons, the total number of switches of the crossbar switch required to connect the ports reaches the product J•K•b, where b is the word width in bits of the I/O port. Thus, the number of switches becomes impractically high as the number of neurons in the artificial neural network increases.

Furthermore, the I/O bandwidth of input $X_j$ is less than the I/O bandwidth of synaptic weight $W_{ij}$ (i.e., the intra-neuron bandwidth) because of iterative use of the input $X_j$ in summing up the weighted inputs. More specifically, the weighted-sum expression for each neuron can be denoted as follows:

$$\sum_{j=1}^{N} (W_{ij} - X_j)^2 \; i = 1, 2, \ldots, I \quad [2]$$

where I is the number of neurons.

A neuron cannot receive the next input $X_{j+1}$ until it completes calculating the weighted-sum expression for which the present input is $X_j$. Accordingly, the rate at which a neuron receives the input $X_j$ is less than the rate at which neuron receives the synaptic weight $W_{ij}$. As a result, the timing of this type of neural network is relatively more complex. Therefore, a need has arisen for a new artificial neural network with mininized I/O bandwidth of neurons and a decreased number of switches for subneural network interconnection. Also, a new neural network architecture is needed for reducing the impact of physical constraints, such as the limited pin count, imposed by the semiconductor chip. Still further, there is a need for easily reconfiguring the topology of an artificial neural network.

$$Y_i = S \left( \sum_{j=1}^{N} (W_{ij} - X_j)^2 \right), i = 1, 2, \ldots I \quad [3]$$

where I is the number of neurons.

Therefore, a need has arisen for devising a new artificial neural network with minimized I/O bandwidth of neurons and a decreased number of switches for subneural-network interconnection. Also, a new neural network architecture is needed for lessening the physical constraints, such as the limited pin count, imposed on the semiconductor chip, and for easily reconfiguring the topology of an artificial neural network.

SUMMARY

In accordance with the present invention, a reconfigurable artificial neural network is disclosed. In one embodiment, the reconfigurable neural network includes a plurality of switches each having at least two conductive leads. The switches are programmed so that the data flow direction of the conductive leads of the switches can be selected. More specifically, each switch can be programmed so that one of the conductive leads is an input switch lead and another one of the conductive leads is an output switch lead. The reconfigurable neural network also includes a plurality of serial-in-serial-out processing elements that are interconnected through the plurality of switches in a one dimensional manner. The neural network is reconfigured by reprogramming the data flow direction of the switches.

According to another aspect of the present invention, the serial-in-serial-out processing elements include difference-square accumulator elements, each of which includes: (a) a serial-in-parallel-out accumulator coupled to one of the switches for calculating a sum of difference-squares of the weights and inputs; (b) an activation function circuit coupled to an output lead of the accumulator for generating a neuron output signal; and (c) a parallel-in-serial-out shift register coupled to the activation function circuit for providing the neuron output signal serially to another of the interconnected switches.

One embodiment of the serial-in-parallel-out difference-square accumulator includes: (1) a memory for storing a plurality of weights; (2) a parallel-in-serial-out shift register for converting the weights into serial outputs; (3) a serial adder for adding the neuron inputs and the complemented weights; (4) a serial-in-parallel-out register for storing the output of the serial adder; (5) a gate circuit for gating the parallel output from the serial-in-parallel-out register; (6) a tri-operand adder for summing the output from the serial adder, the gating circuit and the previous output from the tri-operand adder; and (7) a shifter for processing output of the tri-operand adder, the output of the shifter being received by the tri-operand adder and the activation function circuit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
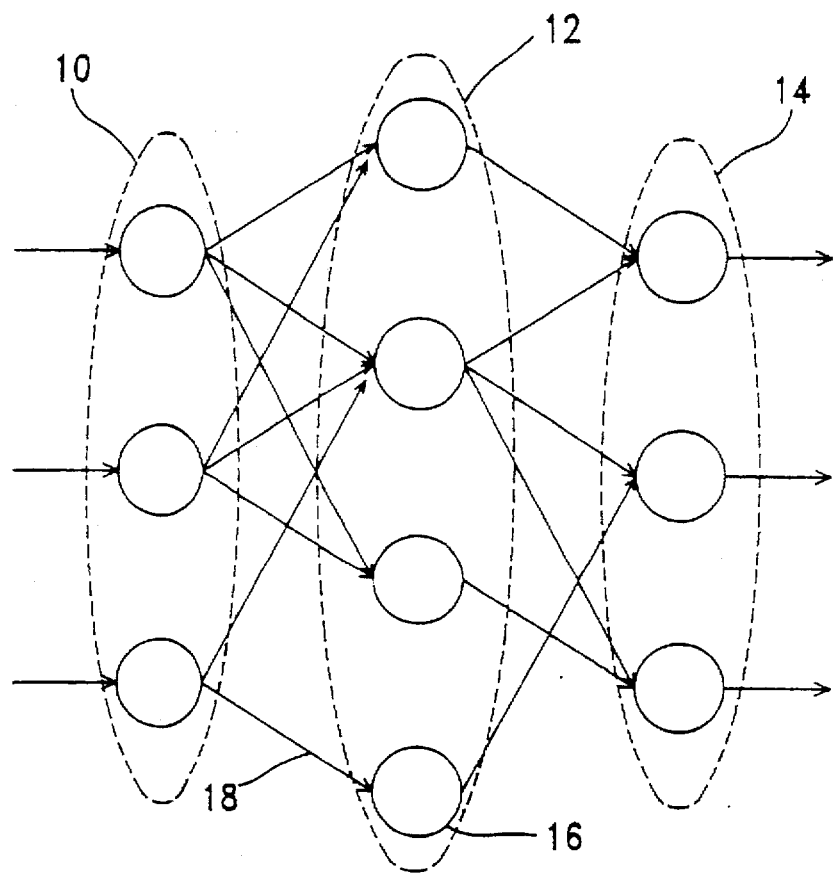
FIG. 1 is a block diagram illustrating an example of an artificial neural network.
Figure 2:
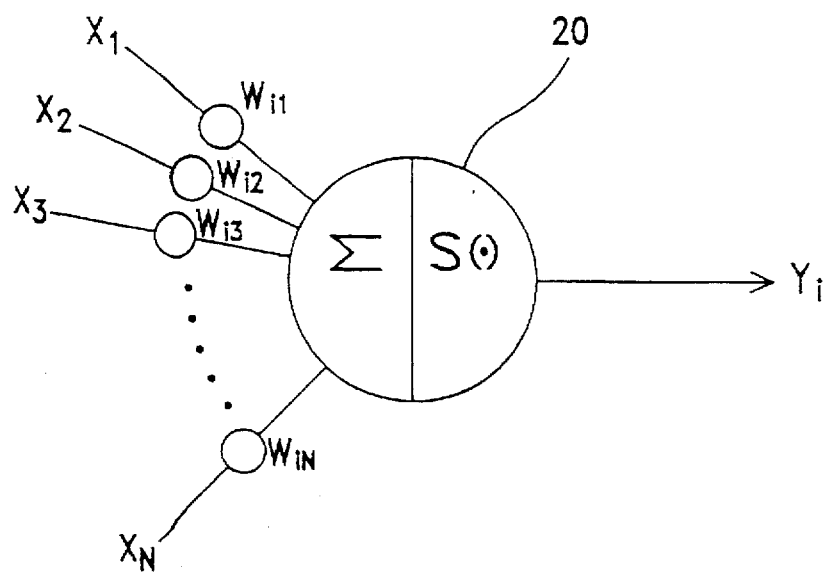
FIG. 2 is a block diagram of an exemplary neuron model.
Figure 3A:
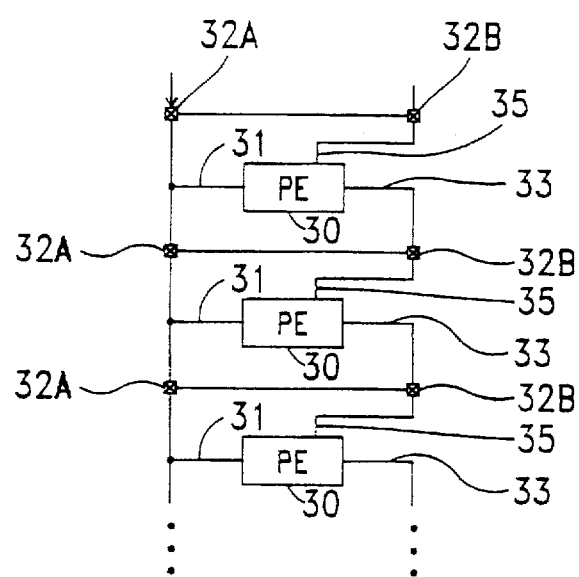
FIG. 3A is a block diagram of a reconfigurable artificial neural network according to one embodiment of the present invention.

FIG. 3A shows an artificial neural network according to one embodiment of the present invention, implemented in a semiconductor integrated circuit. This embodiment of the artificial neural network includes several substantially identical processing elements (PEs) 30 with bit-serial input lead 31 and bit-serial output lead 33. Each PE 30 neuron's decision algorithm, such as a weighted-sum algorithm or a difference-square algorithm. In this embodiment, each PE 30, also referred to as a neuron, has a register (described below in conjunction with FIG. 3B) that can be serially loaded from an input lead 35.

This artificial neural network also includes several substantially identical switch boxes 32 that interconnect the PEs 30 together. More specifically, the PEs 30 can be interconnected in a one-dimension array structure through the switch boxes 32A and 32B. The switch boxes 32A are connected to the input leads 31 of two PEs 30 and to a switch box 32B, whereas the switch boxes 32B are connected to the output lead 33 of one PE 30, the input lead 35 of a next PE 30 and to an input lead of a switch box 32A. The interconnections of the PEs 30 and the switch boxes 32A and 32B are as follows.

Each switch box 32A has three leads, and is programmed to serve in a manner similar to a multiplexer. More specifically, each switch box 32A is programmed to select one of two of its leads that serves as input leads to electrically connect to the remaining lead that serves as an output lead. In this embodiment, the typical switch box 32A has (a) a first input lead connected to the output lead of a preceding switch box 32A, (b) a second input lead connected to an output lead of a switch box 32B, and (c) an output lead connected to the input lead of a next switch box 32A and the input lead 31 of a PE 30. Thus, each switch box 32A in the layer (except the first switch box, which receives the output from the preceding layer) multiplexes either the output lead of the preceding switch box 32A or an output lead of a switch box 32B to the input lead of a next PE 30.

Each switch box 32B also has three leads, but is programmed to serve in a manner similar to a demultiplexer. More specifically, each switch box 32B is programmed to electrically connect one of its leads that serves as an input lead to either of its other two leads that serves as output leads. In this embodiment, the typical switch box 32A has (a) an input lead connected to the output lead 33 of a PE 30, (b) a first output lead connected to an input lead 35 of a next PE 30, and (c) a second output lead connected to the second input lead of a next switch box 32A. Thus, each switch box 32B in the layer (except the first switch box, which can left open-circuited) demultiplexes the output lead 33 of its corresponding PE 30 to either the register of the next PE 30 or the second input lead of a switch box 32A.

Any suitable method of programming the switches may be used such as, for example, electrical control signals from a memory, register fuse or antifuse. As a result, a neural network according to the present invention has a smaller, simpler switching scheme capable of reconfiguring the network, compared to conventional artificial neural networks having parallel switching schemes. Thus, a neural network structure according to the present invention can be advantageously implemented in integrated circuit form with a relatively large number of neurons and a relative low number of I/O pins.

In operation, this neural network structure can be programmed to implement a multi-layer neural network as follows. A group of PEs 30 is selected to form a layer. The switch boxes 32A connected to the input leads 31 of these PEs 30 are each configured to select their first input lead to electrically connect to its output lead. Consequently, each PE 30 in the layer receives the serial output from the preceding layer in parallel (i.e., the output from the preceding layer is broadcast to the PEs 30 in the layer. A PE 30 can be programmed with a weight of zero corresponding to a particular input to implement a neuron that does not receive that particular input.

The switch boxes 32B connected to the output leads 33 of these PEs 30 are each configured to select the input lead 35 to connect to its input lead (connect to the output lead 33 of its corresponding PE 30). The switch box 32B connected to the output lead 33 of the last PE 30 in the layer is configured to select the second input lead of the switch box 32A (i.e., the switch box of the first PE 30 in the next layer). Consequently, the registers of the PEs 30 in effect form a single large register.

After receiving their broadcasted input (i.e., the output of the preceding layer), each PE 30 in the layer processes the input substantially simultaneously, which is then loaded into its register. As stated above, the registers of the PEs 30 form a large register, that is then serially outputted to the next layer.

Figure 3B:
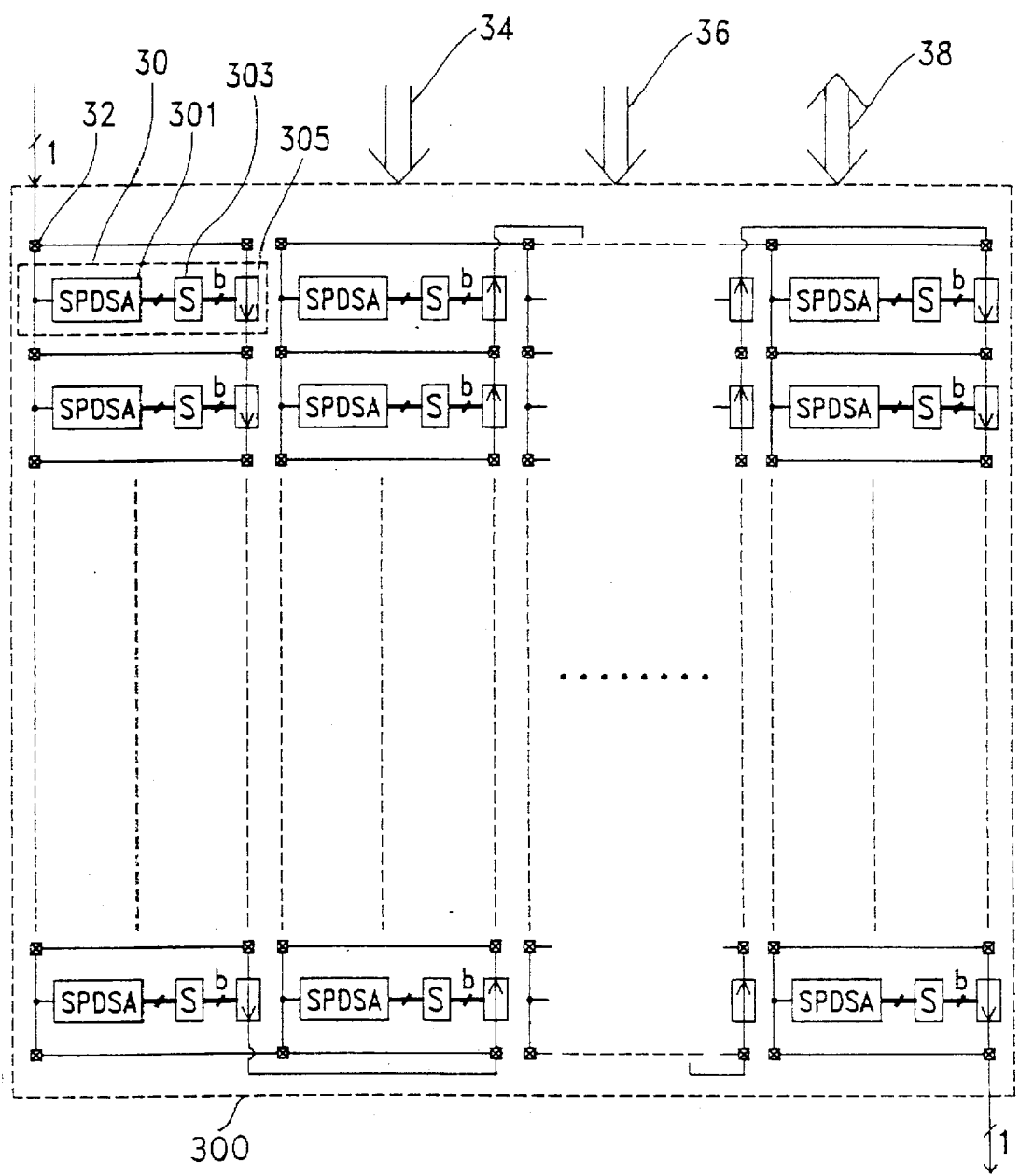
FIG. 3B is a block diagram of a reconfigurable artificial neural network according to another embodiment of the present invention.

FIG. 3B is a block diagram of an artificial neural network 300 according to another embodiment of the present invention. In this embodiment, each PE 30 includes a serial-in-parallel-out difference-square accumulator (SPDSA) 301. Each SPDSA 301 receives data broadcasted from the bit-serial input lead 31, and is capable of calculating the sum of weighted inputs according to the equation below:

$$\sum_{j=1}^{N} (W_{ij} - X_j)^2, i = 1, 2, \ldots, I \qquad [4]$$

where "i" is the number of neurons in a layer.

The SPDSA 301 is described further below in conjunction with FIG. 5. The difference-square output from the SPDSA 301 is then processed through an activation function circuit 303. The activation function circuit 303 implements a non-linear function such as, for example, a sigmoid function, a Gaussian function, a square function or a step function.

In this embodiment, the activation function circuit 303 receives parallel difference-square data from the SPDSA 301 and applies the activation function, generating a parallel output. The parallel output from the activation function circuit 303 is then loaded into a parallel-in-serial-out shift register 305, which transfers the processed data in a serial format to the output lead 33 of the PE 30. The register 305 can also receive serial data from register 305 of a preceding PE 30 through the input lead 35. The artificial neural network 300 further includes a memory (not shown), a control bus 34, an address bus 36 and a data bus 38 for receiving synaptic weights from an outside controller (not shown). In this embodiment, the outside controller loads the synaptic weights in parallel into the memory (described below in conjunction with FIG. 5) of each SPDSA 301 by providing a load command on the control bus 34 with the desired synaptic weights on the data bus 38 and the corresponding address on the address bus 36. The memory and buses for loading the memory are well known in the art of digital neural networks and need not be described in detail.

Figure 4A:
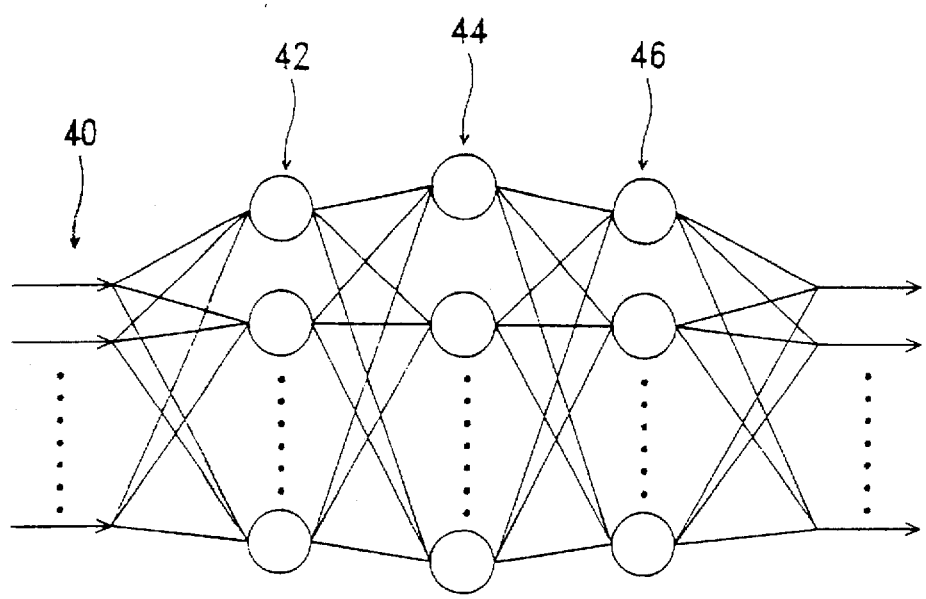
FIG. 4A is a block diagram of one example of a neural network.
Figure 4B:
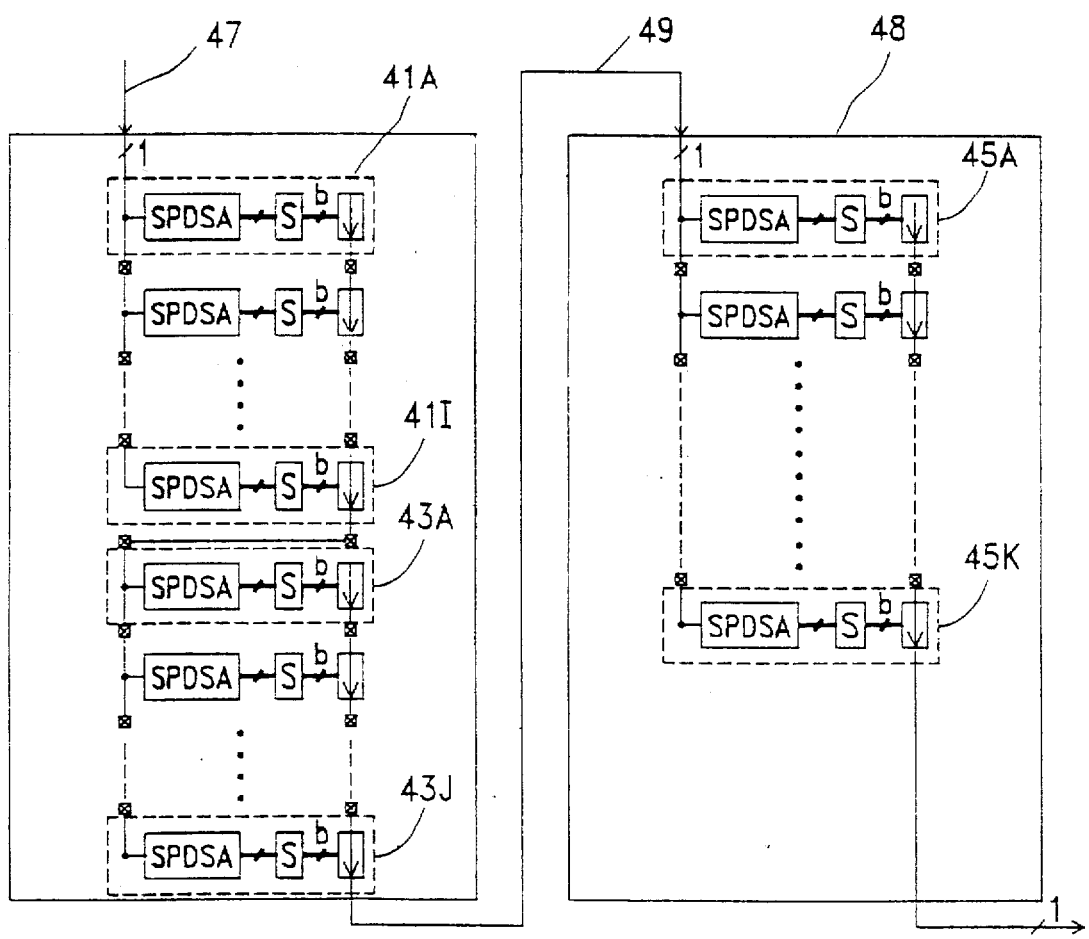
FIG. 4B is a block diagram of the reconfigurable artificial neural network depicted in FIG. 3B implementing the neural network depicted FIG. 4A.

Reconfiguring the network includes changing the number of neurons in a layer or changing the number of layers. Referring now to FIG. 4A, an exemplary neural network is shown having an input layer 40 with H inputs, a first hidden layer 42 with I neurons, a second hidden layer 44 with J neurons and an output layer 46 with K neurons. As shown in FIG. 4B, this topology can be implemented using an artificial neural network integrated circuits substantially identical to the artificial neural network 300 (FIG. 3B). For clarity, the unused switch boxes and interconnected leads are not shown.

Referring now to FIGS. 4A and 4B, the PEs 41A–41I correspond to the I neurons in the first hidden layer 42, and the PEs 43A–43J correspond to the J neurons of the second hidden layer 44, which are all implemented on a neural network integrated circuit 40. The PEs 45A–45K correspond to the K neurons of the output layer 46 and are implemented on a neural network integrated circuit 48.

Data is input to the input layer 40 from the bit-serial input lead 47 and is broadcasted to the PEs 41A–41I. The switch boxes are configured so that PEs 41A–41I receive the serial data substantially simultaneously. The PEs 41A–41I then operate on the input data as described above in conjunction with FIG. 3B. Thereafter, the processed data from each of the processing elements 41A–41I are shifted out serially to the next layer, i.e., the second hidden layer 44. More specifically, the switch boxes are configured so that the shift registers of the PEs 41A–41I are connected in series, forming a single shift register. The switch box connected to the output lead of the shift register of the PE 41I is then connected to the second hidden layer 44. The switch boxes connected to the input leads of the PEs 43A–43J of the second layer 44 so that the output of the shift register of PE 41I is provided globally to the PEs 43A–43J. In this embodiment, the processed data from the second hidden layer 44 is transmitted via a conductor 49 to another neural network integrated circuit 48, which includes the K PEs 45A–45K and several programmed switch boxes.

The topology partition described above can be accomplished quite easily with only a bit-wise connector 49. For example, if a chip can only accommodate about (I+J) neurons, i.e., the total neurons of the first hidden layer 42 and the second hidden layer 44 (FIG. 4A), the K neurons of the output layer 46 are therefore placed on another chip 48 (FIG. 4B). The output bit from the second hidden layer is connected to the chip 48 via a single bit connector 49.

Continuing with the example of FIG. 4A, the minimum total number of clock cycles required to calculate the output resulting from an input is calculated as follows. If the resolution of the neural network is b bits and there are H inputs from the input layer 40 to the first hidden layer 42, then (H×b) clock cycles are required for the first hidden layer 42 to receive all of the inputs. Further, because there are I neurons in the first hidden layer 42, (I×b) clock cycles are required for outputting the results from the first hidden layer 42 to the second hidden layer 44. Because there are J neurons in the second hidden layer, (J×b) clock cycles are needed for outputting the results from the second hidden layer 42 to the output layer 46. Finally, because there are K neurons in the output layer 46, (K×b) clock cycles are required to shift the final results from the output layer 46.

Figure 5:
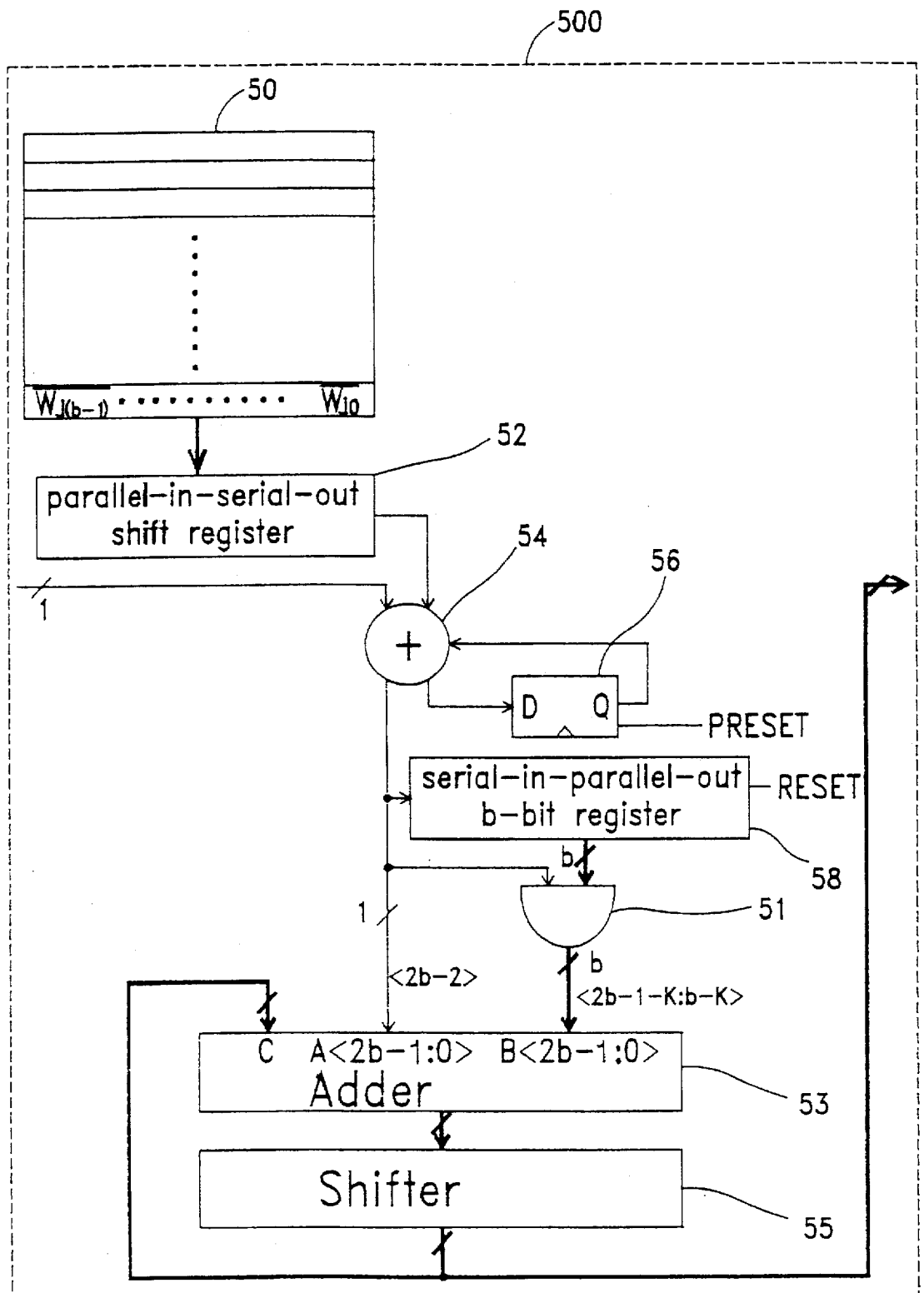
FIG. 5 is a block diagram of one embodiment of a serial-in-parallel-out difference-square accumulator (SPDSA) according to the present invention.

FIG. 5 shows one embodiment of the serial-in-parallel-out difference-square accumulator (SPDSA) 500 according to the present invention. SPDSA 500 includes a storage area 50, in which the 1's complement of synaptic weights $\overline{W}_{j(b-1)}, \ldots, \overline{W}_{j0}$ are stored. The storage area 50 can be any suitable type of storage device such as, for example, a dynamic random access memory (DRAM), static RAM (SRAM), or electrically erasable programmable read only memory (EEPROM).

It can be shown that the equation:

$$\sum_{j=1}^{N} (W_j - X_j)^2 = \sum_{j=1}^{N} (X_j - W_j)^2 = \sum_{j=1}^{N} Y_j^2 = \sum_{j=1}^{N} (Y_{j(b-1)}^2, \ldots, Y_{j0}) \qquad [5]$$

where $W_j$ and $X_j$ are b-bit words, can be solved by calculating the recursive equation $$Y_j^2 = \sum_{k=0}^{b-1} \{(Y_{jk}^2 \cdot 2^{2k}) + (2^{k+1} \cdot Y_{jk} \cdot A_k - 1)\} \qquad [6]$$

where $Y_j = X_j - W_j = X_j + \overline{W}_j + 1$, and where $A_k = Y_{jk} \cdot 2^k + A_{k-1}$.

The SPDSA 500 implements this recursive equation as follows. The data stored in the storage area 50 is read out by words of b bits to a parallel-in-serial-out shift register 52. The serial output $\overline{W}_{j0}, \overline{W}_{j(b-1)}$ of the parallel-in-serial-out shift register 52 and the bit-serial input $X_{j0}, X_{j1} \ldots$ are input into a serial adder 54. The signal $\overline{W}_{j0}, \ldots \overline{W}_{j(b-1)}$ are serially input into the input lead of the serial adder 54. In this embodiment, the serial adder 54 is a conventional bit-wise adder in which the carry output of the serial adder 54 is stored to a flip-flop 56 whose output is further fed back to the carry input of serial adder 54. The flip-flop 56 is preset to 1 every b clock cycles. As a result, the serial adder 54 calculates the difference $Y_j = X_j - W_j$, where $X_j$ is equal to $X_{j(b-1)}, \ldots, X_{j0}$, and $W_j$ is equal to the synaptic weights $W_{j(b-1)}, \ldots, W_{j0}$. In accordance with the recursive relationship of equation [6] and the fact that multiplication by two in binary arithmetic is accomplished by shifting, $Y_j$ appropriately shifted provides $A_{k-1}$.

As the sum is generated by the bit-wise adder 54, it is loaded a serial-in-parallel-out register 58 having width b. The register 58 is also reset to zero every b clock cycles. Thus, the register 58 stores the value $Y_j$. In addition, as each bit is added (i.e., $Y_{jk}$*), it is provided to a gating circuit 51. In this embodiment, the gating circuit 51 are b two-input AND gates, each of which receiving a corresponding bit from the register 58 at one input lead and the value of $Y_{jk}$ at the other input lead. Each output of the gating circuit 51 provides the term $(Y_{jk} \cdot A_{k-1})$, which only needs to be appropriately shifted to calculate the term $(2^{k+1} \cdot Y_{jk} \cdot A_{k-1})$ of equation [6]. In this embodiment, each output of the gating circuit 51 is received by the three-operand adder 53 in the <2b—k: b–k> most significant bits of the input port B, with leading zeros. Trailing zeros fill in the rest of the bits in the input port B. The output of the gating circuit 51 is provided to an input port B of a three-operand adder 53. Any suitable three operand adder, which are well known in the art of digital neural networks, can be used to implement three-operand adder 53.

In addition, $Y_{jk}$ is provided to another input port A of the three-operand adder 53. This circuit relies on the fact that $Y_{jk}^2$ is equal to $Y_{jk}$ (i.e., a one or a zero) because $Y_{jk}$ has a binary value. Again, with appropriate shifting, $Y_{jk}$ provides the term $(Y_{jk}^2 \cdot 2^{2k})$ of equation [6]. In this embodiment, the three-operand adder 53 receives the $Y_{jk}$ from the serial adder 54 in the most significant bit of the input port A, with trailing zeros filling in the rest of the bits of the input port A, and with a leading zero. The output port of the three-operand adder 53 is connected to a shifter 55, which can be implemented with any suitable parallel load/access shift register. The parallel output port of the shifter 55 is connected to a third input port C of the three-operand adder 53. As described below, the shifter 55 provides the term $A_{k-1}^2$ to the input port C of the three operand adder 53.

The SPDSA 500 operates as follows. At the start of each jth input, the shifter 55 and the register 58 are reset to zero (i.e., $A_{-1}$ is defined as zero), the flip-flop 56 is preset to 1. The first bit of the input (i.e., $X_{j0}$) is added to the 1's complemented first bit of the weight (i.e., $W_{j0}$), thereby calculating $Y_{j0}$ (which is also $A_0$), which is stored in the register 58 and provided to the gating circuit 51 and the three-operand adder 53. Because the register 58 and the shifter 55 were reset, the three-operand adder 53 receives zeros at the input ports C and B. As a result, the three operand adder adds zero to $Y_{j0}$, thereby calculating $\{(Y_{j0}^2 \cdot 2^0)+(2^1 \cdot Y_{j0} \cdot A_{-1})\}$, which is $A_0^2$, which is then stored in the shifter 55.

At the next clock cycle, the second bit of the input and the second bit of the weight (1's complemented) are added, thereby calculating $Y_{j1} \cdot Y_{j1}$ is stored in the register 58 and provided to the gating circuit 51 and the three-operand adder 53. The three-operand adder 53 also receives $(Y_{j1} \cdot A_0)$ at the input port B from the gating circuit 51. In addition, the three-operand adder 53 receives $\{(Y_{j0}^2 \cdot 2^0)+(2^1 \cdot Y_{j1} \cdot A_{-1})$ at the input port C. Before adding the output of the gating circuit 51 to $Y_{j1}$, the shifter 55 shifts its contents twice to the right. Thus, when the three-operand adder 53 provides its output to the shifter 55, the bits are, in effect, divided by four relative to the value (i.e., $A_0^2$) already stored in the shifter. Thus, the three-operand adder 53 then adds $\{(Y_{j0}^2 \cdot 2^0)+ (2^1 \cdot Y_{j0} \cdot A_{-1})\}$, $(Y_{j1}^2 \cdot 2^2)$ and $(2^2 \cdot Y$ of the first two summation terms of equation [6].

The process is then repeated, with the shifter 55 arithematically shifting its contents right two bits at every clock cycle before adding the operands at its input ports. At the end of b clock cycles, the shifter 55 then shifts its contents left (2b−2) bits to obtain the solution to equation [6].

Afterward, the contents of the shifter 55 are provided in parallel to the activation function circuit 303 (FIG. 3). In this embodiment, the activation function circuit 303 is implemented by a look-up table (LUT) device, such as a read-only-memory (ROM mapping table. Although a LUT is described, the activation function circuit 303 can be implemented in any suitable manner. The parallel data from the activation function circuit 303 is then provided to the parallel-in-serial-out register 305 (FIG. 3).

The embodiments described above are intended to be illustrative rather than limiting the invention to the described embodiments. For example, in other embodiments, different implementations are used to calculate the difference-square. In addition, in other embodiments, the memory is loaded with weights serially rather than from a bus. Further, those skilled in the art of digital neural networks can easily implement without undue experimentation a learning scheme whereby the weights are changed to allow the neural network to operate more efficiently. Accordingly, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A neural network circuit, comprising:

first switching means having a first lead, a second lead and a third lead;

second switching means having a first lead, a second lead and a third lead, said second lead of said second switching means coupled to said second lead of said first switching means;

a first processing element (PE) having a first input lead, a second input lead and an output lead, said first input lead of said first PE coupled to said third lead of said first switching means, said second input lead coupled to said third lead of said second switching means, wherein said first PE outputting at said output lead of said first PE a serial digital output signal dependent on a first serial digital input signal received at said first input lead of said first PE;

third switching means having a first lead, a second lead and a third lead, said first lead of said third switching means coupled to said first input lead of said first PE;

fourth switching means having a first lead, a second lead, and a third lead, said first lead of said fourth switching means coupled to said output lead of said first PE, said second lead of said fourth switching means coupled to said second lead of said third switching means; and a second PE having a first input lead, a second input lead and an output lead, said first input lead coupled to said third lead of said fourth switching means, said second input lead of said second PE coupled to said third lead of said fourth switching means, wherein said second PE outputting at said output lead of said second PE a serial digital output signal dependent on a serial digital input signal received at said first input lead of said second PE, wherein:

said first switching means being selectably configured to provide a signal received on said first lead of said first switching means to said first input lead of said first PE or a signal received from said second lead of said second switching means to said first input lead of said first PE, said second switching means being selectably configured to provide a signal received on said first lead of said second switching means to said second input lead of said first PE or to said second lead of said first switching means, said third switching means being selectably configured to provide a signal received from said third lead of said first switching means to said first input lead of said second PE or a signal received from said second lead of said fourth switching means to said first input lead of said second PE, and said fourth switching means being selectably configured to provide a signal received from said output lead of said first PE to said second lead of said fourth switching means or to said second input lead of said second PE.

2. The neural network circuit of claim 1 wherein said first PE calculates a difference-square accumulation of serial digital input signals received at said first input lead of said first PE.

3. The neural network circuit of claim 2 wherein said first PE outputs at said output lead of said first PE a serial digital output signal dependent on a serial digital signal received at said second input lead of said first PE.

4. The neural network circuit of claim 3 wherein said first PE comprises a shift register, wherein said shift register stores serial digital input signal received at said second input lead of said first PE and serially outputting said stored serial digital input signal on said output lead of said first PE.

5. The neural network circuit of claim 4 wherein said shift register being loaded in parallel with said difference-square accumulation and serially outputting said difference-square accumulation on said output lead of said first PE.

6. The neural network circuit of claim 5 wherein said first PE and said second PE can be selectable grouped into a layer of a neural network by configuring:

said third switching means to electrically connect said first input lead of said first PE to said first input lead of said second PE; and said fourth switching means to electrically connect said output lead of said first PE to said second input lead of said second PE.

7. The neural network circuit of claim 5 wherein said first PE and said second PE can be selectably grouped into separate layers of a neural network by configuring said third switching means and said fourth switching means to electrically connect said output lead of said first PE to said first input lead of said second PE.

8. The neural network circuit of claim 5 wherein said first PE further comprises:

a serial-in-parallel-out difference-square accumulator (SPDSA) having a first input lead coupled to said input lead of said first PE;

an activation circuit having an input port coupled to an output port of said SPDSA and an input port of said shift register, wherein said activation circuit operating on an output signal from said SPDSA with an activation function; and a storage area coupled to said SPDSA, wherein said storage area stores weights used in calculating a distance from an input signal received by said SPDSA.

9. The neural network circuit of claim 8 wherein SPDSA further comprises:

second shift register having an input port and an output lead, said input port of said second shift register coupled to said storage area, wherein said second shift register receiving a weight from said storage area and serially outputting said weight on said output lead of said second shift register;

a bit-wise adder having a first input lead coupled to said input lead of said SPDSA and a second input lead coupled to said output lead of said second shift register, wherein said bit-wise adder complementing a signal received at second input lead of said bit-wise adder and adding said complemented signal to a signal received at said first input lead of said bit-wise adder;

a flip-flop having an input lead coupled to an output lead of said bit-wise adder and an output lead coupled to a carry input lead of said bit-wise adder;

a serial-in-parallel-out register coupled to said output lead of said bit-wise adder;

a gating circuit coupled to an output port of said serial-in-parallel-out register;

a three operand adder having a first operand input port coupled to an output port of said gating circuit and a second operand input port coupled to said output lead of said bit-wise adder; and a shifter having an input port coupled to an output port of said three operand adder and having an output port coupled to a third operand port of said three operand adder and to said input port of said activation circuit, wherein said shifter storing an output signal from said three operand adder during a kth clock cycle and providing said output signal from said three operand adder to said third operand port of said three operand adder during a kth+1 clock cycle.

10. The neural network circuit of claim 9 wherein said shifter shifts its contents two bits before storing said output signal from said three operand adder.

11. The neural network circuit of claim 8 wherein said activation circuit comprises a look-up table device.

12. The neural network circuit of claim 8 wherein said storage area comprises a random access memory.

13. The neural network circuit of claim 9 wherein said SPDSA calculates a first difference-square of a first weight stored in said storage area and a first bit-serial input signal received by said first PE, a second difference-square of a second weight and a second bit-serial input signal received by said first PE, and summing said first and second difference squares.

14. The neural network circuit of claim 11 wherein said look-up table device comprises a read only memory.

15. The neural network circuit of claim 9 wherein said gating circuit comprises a plurality of AND gates each having a first input lead coupled to receive a corresponding output bit of said output signal of said serial-in-parallel-out register and having a second input lead coupled to said output lead of said bit-wise adder.

* * * * *